United States Patent [19]

Seraji et al.

[11] Patent Number: 5,150,026

[45] Date of Patent: Sep. 22, 1992

[54] OBSTACLE AVOIDANCE FOR REDUNDANT ROBOTS USING CONFIGURATION CONTROL

[75] Inventors: Homayoun Seraji, La Crescenta, Calif.; Richard D. Colbaugh; Kristin L. Glass, both of Las Cruces, N. Mex.

[73] Assignee: The United States of America as represented by the Administrator of the National Aeronautics and Space Administration, Washington, D.C.

[21] Appl. No.: 615,668

[22] Filed: Nov. 19, 1990

[51] Int. Cl.$^5$ .............................. G05B 19/42
[52] U.S. Cl. ..................... 318/568.11; 318/567; 318/568.19; 364/191; 901/47; 395/90
[58] Field of Search ................ 318/560-636; 364/424.01, 513, 424.02, 461, 474.2, 474.3, 474.31; 901/9, 14, 15; 250/222.1; 356/5

[56] References Cited

U.S. PATENT DOCUMENTS

| | | | |
|---|---|---|---|
| 4,558,215 | 12/1985 | Kaneko et al. | 250/222.1 |
| 4,621,332 | 11/1986 | Sugimoto et al. | 364/513 |
| 4,808,063 | 2/1989 | Haley | 318/567 X |
| 4,834,531 | 5/1989 | Ward | 356/5 |
| 4,860,215 | 8/1989 | Seraji | 364/165 X |
| 4,902,126 | 2/1990 | Koechner | 356/5 |
| 4,967,126 | 10/1990 | Gretz et al. | 318/568.19 |
| 4,999,553 | 3/1991 | Seraji | 318/646 |
| 5,023,808 | 6/1991 | Seraji | 364/513 |
| 5,049,796 | 9/1991 | Seraji | 318/568.1 |

OTHER PUBLICATIONS

Seraji et al., "Obstacle Avoidance for Redundant Robots Using Configuration Control", Dec. 1989, Journal of Robotic Systems, vol. 6, No. 6, pp. 721-745.

Primary Examiner—Paul Ip
Attorney, Agent, or Firm—Thomas H. Jones; John R. Manning; Guy M. Miller

[57] ABSTRACT

A redundant robot control scheme is provided for avoiding obstacles in a workspace during motion of an end effector along a preselected trajectory by stopping motion of the critical point on the robot closest to the obstacle when the distance therebetween is reduced to a predetermined sphere of influence surrounding the obstacle. Algorithms are provided for conveniently determining the critical point and critical distance.

1 Claim, 2 Drawing Sheets

OBSTACLE AVOIDANCE FOR REDUNDANT ROBOTS USING CONFIGURATION CONTROL

ORIGIN OF THE INVENTION

The invention described herein was made in the performance of work under a NASA contract, and is subject to the provisions of Public Law 96-517 (35 USC 202) in which the Contractor has elected not to retain title.

1. Technical Field

The present invention relates to the robotic systems and, in particular, to the operation of robotic systems to avoid obstacles while positioning end effectors.

2. Background of the Invention

Conventional obstacle avoidance during end effector positioning in robotic systems is included in the high level or task programming for the system. Dynamic or real time obstacle avoidance has been difficult to achieve in part because of the vast amounts of data that would have to be communicated between the high level processing unit and the robot servo systems.

Robotic systems which are capable of motion in more degrees of freedom than required for the programmed task are known as redundant robots. A simple example of a redundant robot is a robotic arm capable of positioning an end effector in an 2 dimensional plane programmed to position the end effector at points along a line in that plane. An approach to the control of redundant robots is disclosed in a copending patent application filed Dec. 28, 1989, U.S. Ser. No. 07/459,029 in the name of one of the inventors hereof and assigned to a common assignee, is known as configuration control. Configuration control provides a convenient technique for beneficially utilizing the redundancy in such systems.

What is needed is a dynamic, real time technique which utilizes the inherent qualities of redundant robots for obstacle avoidance.

BRIEF STATEMENT OF THE INVENTION

The preceding and other shortcomings of the prior art are addressed and overcome by the present invention that provides, in a first aspect, a method of operating a redundant robot system to position an end effector in a workspace by changing joint angles between links connected to the end effector, determining the location of an obstacle in the workspace, determining a sphere of influence having a fixed radius surrounding the obstacle, determining a critical point, on a link, closest to the sphere of influence, determining a critical distance between the critical point and the obstacle, and operating the robot system to stop motion of the critical point toward the obstacle when the critical distance equals the radius.

In another aspect, the present invention provides a redundant robot system including an end effector, interconnected link means for positioning the end effector in a workspace, means for locating the position of an obstacle in the workspace, means for determining a critical point on the link means closest to the obstacle; means for continuously determining a critical distance between the critical point and the obstacle, means for operating the robot system to position the end effector along a preselected trajectory in the workspace and stopping motion of the critical point when the critical distance is reduced to a predetermined minimum.

These and other features and advantages of this invention will become further apparent from the detailed description that follows which is accompanied by a set of drawing figures. In the figures and description, numerals indicate the various features of the invention, like numerals referring to like features throughout both the drawings and the description.

BRIEF DESCRIPTION OF THE DRAWING(S)

DETAILED DESCRIPTION OF THE INVENTION

Figure 1:
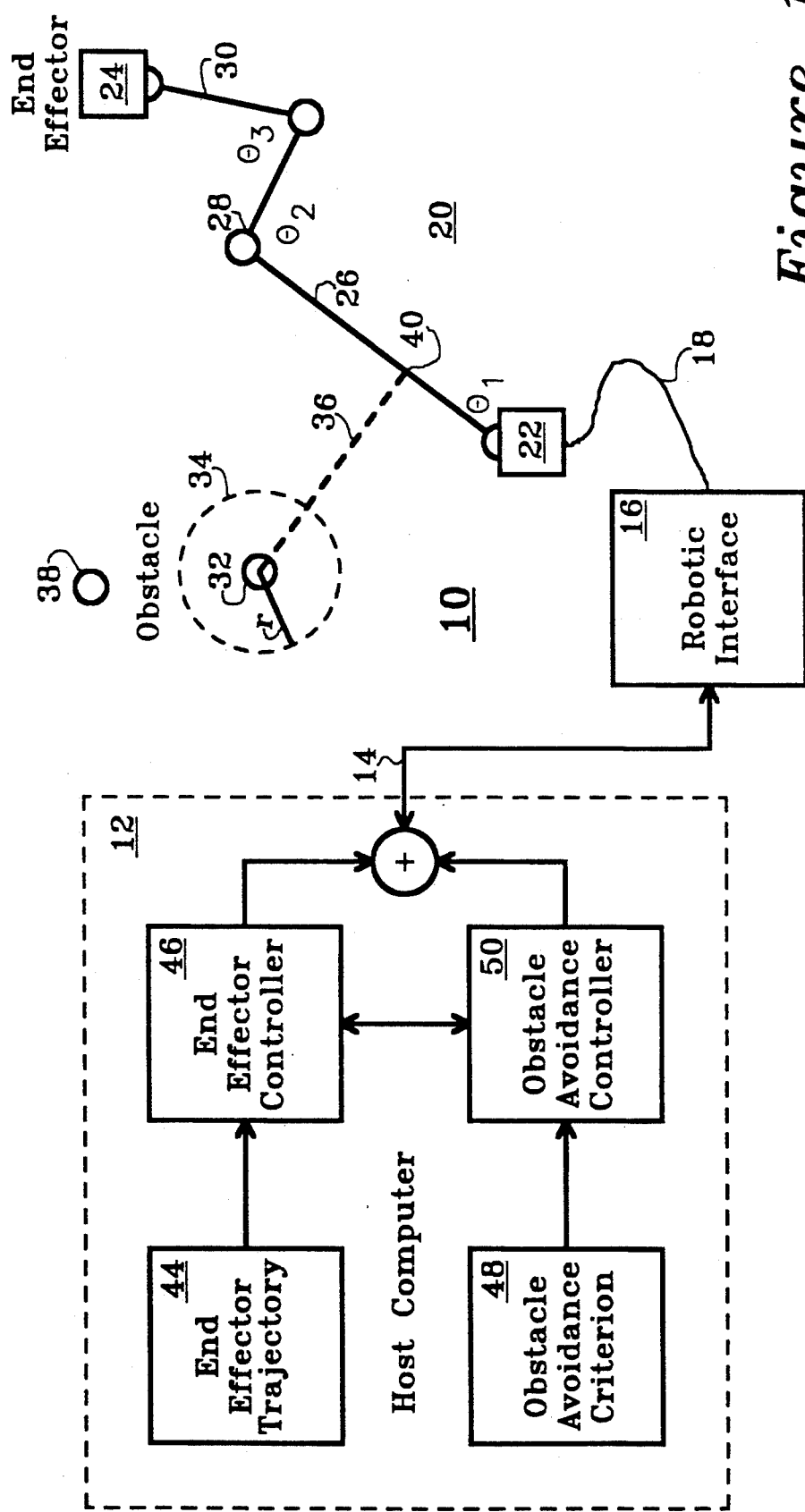
FIG. 1 is a block diagram of a redundant robotic system according to the present invention using configuration control for obstacle avoidance.

Referring now to FIG. 1, robotic system 10 includes host computer 12 connected by bidirectional digital bus 14 to robotic interface 16 which processes the host computer instructions to provide the appropriate commands to robotic arm system 20 via cable 18. Robotic arm system 20 includes base 22 and end effector 24 interconnected by links 26, 28 and 30. Robotic arm system 20 is used to position end effector 24 in accordance with preprogrammed task instructions from host computer 12 to permit the performance of a task.

Robotic arm system 20 controls the position of end effector 24 by adjusting joint angles $\theta_1$, $\theta_2$ and $\theta_3$ between base 22 and link 26, between links 26 and 28 and between links 28 and 30, respectively. Adjustment of these angles permits motion of end effector 24 with more degrees of freedom than required for positioning of end effector 24 in the plane of the figure. Robotic arm system 20 is therefore considered to be a redundant robot.

The redundancy of robotic system 10 is used to good advantage in accordance with the present invention to permit low level, real time obstacle avoidance. Obstacle 32 is potentially in the path of motion of link 26 if, for example, host computer 12 issued instructions to robotic interface 16 to move end effector 24 from its position as shown in the figure to position 38. Proper articulation of links 26, 28 and 30 will permit the positioning of end effector 24 at position 38, but care must be taken to insure that all of the links, particularly link 26, avoids obstacle 32.

In order to insure safety, a spherical zone around obstacle 32 having a radius "r" is designated surrounding obstacle 32 as its sphere of influence or SOI 34. Links 26, 28 and 30 are prevented from entering SOI 34 to guarantee that they do not contact obstacle 32.

The motion of links 26, 28 and 30 and therefore all points thereon may be determined as a function of the articulation of robotic arm system 20, that is, as a function of joint angles $\theta_1$, $\theta_2$ and $\theta_3$. In accordance with the present invention, robotic interface 16 determines the point or points, shown as in the figure as critical point 40, on link 26, 28 and/or on link 30, whichever point is closest to obstacle 32. The distance between obstacle 32 and critical point 40 is designated as critical distance 36.

Critical point 40 is continuously determined as robotic arm system 20 moves links 26, 28 and 30. Critical distance 36 continuously represents the shortest between obstacle 32 and any point on links 26, 28 and 30.

When critical distance 36 is reduced by motion of robotic arm system 20 to equal the value r, the radius of SOI 34, a collision is imminent. In accordance with the present invention, articulation of robotic arm system 20 is then constrained to prevent further reduction of critical distance 36. Of course, further articulation of robotic arm system 20 may result in a change of critical point 40 along link 26 or to another link. Obstacle avoidance is achieved as long as the proper inequality constraints are maintained so that critical distance 36, from whichever is the critical point closest to SOI 34, is equal to or greater than radius r.

Within host computer 12 are end-effector trajectory portion 44 which includes the programming which identifies the intended path of end effector 24 required in order to perform the task at hand. End-effector trajectory portion 44 provides the trajectory information to end effector controller 46 which generates the commands necessary for robotic interface 16 to properly position end effector 24.

In addition the above described portions of a conventional host computer for robot arm control, host computer 12 according to the present invention includes obstacle avoidance criterion 48 which identifies and stores the information necessary to identify and avoid obstacles, such as obstacle 32, including the appropriate radius for SOI 34 and the locations of the obstacles.

The criterion provided by obstacle avoidance criterion 48 are applied to obstacle avoidance controller 50, together with end effector trajectory information from end effector controller 46. The robotic interface control information from end effector controller 46 and obstacle avoidance controller 50 is combined and applied to robotic interface 16 on bidirectional bus 14 to provide end effector positioning information together with servo control instructions permitting obstacle avoidance.

The operation of robotic system 10 may be best described in conjunction with the following brief overview of the configuration control scheme for redundant robots, taken from the article entitled "Obstacle Avoidance for Redundant Robots Using Configuration Control" written by the present inventors and published the Journal of Robotic Systems, Vol. 6, No. 6, pp 721-745, December, 1989. That article provides additional examples of the operation of the present invention.

The robot manipulator under consideration, such as robotic arm system 20, consists of a linkage of rigid bodies with n revolute/prismatic joints. Let $T \in R^n$ be the vector of joint torques/forces and $\theta \in R_n$ be the vector of rotation/translations. The dynamic model of robotic arm system 20 can be derived from Lagrangian mechanics as $$T = \frac{d}{dt}\left[\frac{\partial L}{\partial \dot{\theta}}(\theta,\dot{\theta})\right] - \frac{\partial L}{\partial \theta}(\theta,\dot{\theta}) \quad (1)$$

$$= H(\theta)\ddot{\theta} + V(\theta)\dot{\theta} + G(\theta) \quad (2)$$

where $L(\cdot) \in R$ is the Lagrangian of the robotic arm system 20, and $H \in R^{n \times n}$ and V, $G \in R^n$ are complicated nonlinear functions of $\theta$, $\Lambda$, and end effector 24. Let $X \in R^m$, with $m < n$, define the position and orientation of end effector 24 in the task space. The relationship between the end-effector coordinate X and the joint coordinate $\theta$ can be written as $$X = f(\theta) \quad (3)$$

where $f: R^n \to R^m$ represents forward kinematic translation. Differentiation of equation (3) above with respect to time yields $$\dot{x} = J_e(\theta)\dot{\theta} \quad (4)$$

where $J_e = \partial f/\partial \theta \in R^{n \times m}$ is the Jacobian of robotic arm system 20.

Configuration control provides for the global control of redundant robots such as robotic system 10 and prescribes the selection of a generalized coordinate vector $Y \in R^n$ that is more task-relevant than the joint coordinate vector $\theta$. This configuration vector Y may be controlled globally across the entire workspace by ensuring that Y(t) tracks a desired trajectory $Y_d(t)$ using host computer 12.

The vector Y is defined as:

$$Y = \left[\frac{X}{Z}\right] \quad (5)$$

where $Z \in R^r$, and $r = n - m$ is the degree-of-redundancy of the robotic arm system 20.

The vector Z is chosen as $$Z = g(\theta) \quad (6)$$

where $g: R^n \to R^r$ is a kinematic vector function constructed to reflect the performance of some additional useful task, such as obstacle avoidance. Observe that specifying g and the desired evolution of Y defines the obstacle avoidance task to be performed in addition to the basic task of positioning end effector 24.

The dynamic model of robotic arm system 20 can be derived in terms of the configuration vector Y since this vector is a valid generalized coordinate vector for robotic arm system 20. Proceeding in accordance with equations (1) and (2) shown above yields $$T = \frac{d}{dt}\left[\frac{\partial L}{\partial \dot{Y}}(Y,\dot{Y})\right] - \frac{\partial L}{\partial Y}(Y,\dot{Y}) \quad (7)$$

$$= H_y(Y)\ddot{Y} + V_y(Y,\dot{Y}) + G_Y(Y) \quad (8)$$

where $F \in R^n$ is the generalized force vector corresponding to the generalized coordinate vector Y, and $H_y \in R^{n \times n}$ and $V_y$, $G_y \in R^n$ are complicated nonlinear functions of Y, $\dot{Y}$ and end effector 24.

The centralized control algorithm that ensures that the manipulator control configuration vector Y(t) as shown in equation (8) tracks the desired trajectory $Y_d(t)$ is:

$$F = d(t) + K_p(t)E + K_v(t)\dot{E} + B(t)\dot{Y}_d + C(t)_d + A(t)\ddot{Y}_d \quad (9)$$

where $E = Y_d - Y$ is the configuration tracking error, and $d \in R^n$ and $K_p$, $K_v$, C, B, $A \in R^{n \times n}$ are controller gains which are generated on line in real time according to the following simple adaptation laws:

$$q = W_p E + W_v \dot{E} \quad (10)$$

$$d(t) = d(0) + k_1 \int_0^t q \, dt + h_1 q$$

-continued $$K_p(t) = K_p(0) + k_2 \int_0^t qE'dt + h_2qE'$$

$$K_v(t) = K_v(0) + k_3 \int_0^t q\dot{E}'dt + h_3q\dot{E}'$$

$$C(t) = C(0) + k_4 \int_0^t qY_d'dt + h_4qY_d'$$

$$B(t) = B(0) + k_5 \int_0^t q\dot{Y}_d'dt + h_5q\dot{Y}_d'$$

$$A(t) = A(0) + k_6 \int_0^t q\ddot{Y}_d'dt + h_6q\ddot{Y}_d'$$

In equation (10), the $k_i$ and $h_i$ terms are positive and nonnegative scalar constant adaptation gains, respectively, which are chosen to provide the desired adaptation rates for the controller terms. The constant, usually diagonal, weighting matrices $W_p, W_v \in R^{n \times n}$ are selected to reflect the relative significance of the individual elements of the tracking error vectors E and $\dot{E}$. Under the control laws in accordance with equations (9) and (10), the desired trajectory for end effector 24, $x_d(t)$, is tracked and the extra degrees of freedom are appropriately used to control the evolution of the configuration of robotic arm system 20 through the tracking of the desired kinematic trajectory $Z_d(t)$.

Note that the control force F is computed entirely based on the observed performance of robotic arm system 20 rather than on the dynamic model of robotic arm system 20 as shown in equation (8). The online adaptation of the controller using equation (10) eliminates the need for the complicated mathematical model of the dynamics of robotic arm system 20. This relieves the designer from the derivation, on line computation and knowledge of parameters of the complicated robot dynamic model. The simplicity of this control scheme allows the designer to implement very fast control loops and thereby improve system performance.

The control force F computed in equations (9) and (10) cannot be physically applied to robotic arm system 20 and must be mapped to an equivalent joint torque vector T, in accordance with known techniques.

In the foregoing analysis, the additional task which may be performed as a result of the redundancy may be formulated as the kinematic inequality constraints $$g(\theta) \geq 0 \tag{11}$$

These inequality constraints may readily be incorporated into the configuration control scheme. In order to satisfy the inequality constraints shown in equation (11), the reference trajectory may be defined as $Z_d(t)=0$. The tracking errors due to these constraints are given by $$E_c=0, \dot{E}_c=0 \text{ when } g(\theta) \geq 0$$

$$E_c=-g, \dot{E}_c=-\dot{g} \text{ when } g(\theta) < 0 \tag{12}$$

Therefore, in the additional task controller, the feedforward term is omitted and the feedback control action may be computed as $$F_c = d(t) + K_p(t)E_c + K_v(t)\dot{E}_c \tag{13}$$

where $d$, $K_p$, $K_v$ are the adaptive controller terms given in equation (10) and updated based on the tracking errors in accordance with equation (13). It is important to note that both equality and inequality constraints can exist simultaneously in a given additional task provided the total number of active constraints is not greater than the degree of redundancy r. Using this formulation, the additional task to be performed by redundant robotic arm system 20 can be decomposed into a number of subtasks with different sets of r kinematic constraints, such as different obstacles to be avoided. In the execution of each subtask, the appropriate kinematic constraint is satisfied in addition to the desired motion of end effector 24.

It is important to note that when the number of kinematic constraints c is less than r, the configuration control scheme will automatically use the $r-c$ extra degrees of redundancy to minimize the robotic kinetic energy integrated over the entire trajectory. This is a very desirable feature of global optimality in many applications.

The problem of obstacle avoidance is to ensure that links 26, 28 and 30 do not collide with obstacles in the workplace, such as obstacle 32, while robotic arm system 20 moves end effector 24 along a desired, preplanned trajectory to perform a task. In accordance with the present invention, the obstacle avoidance criteria may be formulated as a set of kinematic inequality constraints in the tasks space. The configuration control scheme is used to ensure that these inequality constraints are satisfied while the desired trajectory for end effector 24 is tracked.

As noted above, obstacle 32 is enclosed in SOI 34, a convex volume with sufficient volume surrounding obstacle 32 to provide protection so that transient errors will not cause a collision. The basic strategy is to inhibit motion of critical point 40 toward obstacle 32 when critical point 40 enters SOI 34.

Figure 2:
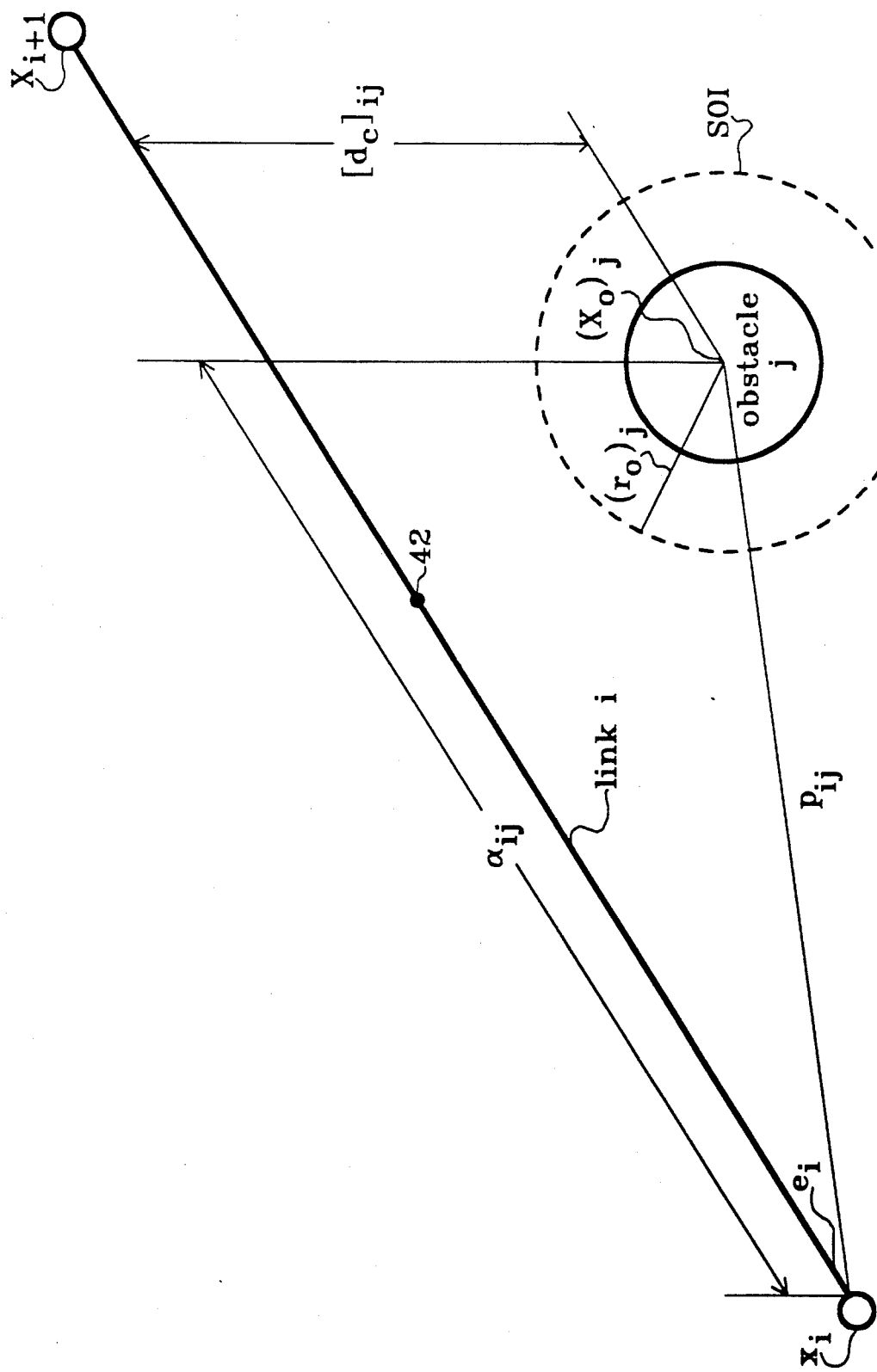
FIG. 2 is a generalized representation of a robot link and obstacle pair.

The approach to obstacle avoidance provided herein may be described in greater detail with respect to FIG. 2 which provides a generalized representation of a robot link and obstacle pair similar to link 26 and obstacle 32 as shown in FIG. 1. Referring therefore now to FIG. 2, link i of length $l_i$ is shown together with obstacle j with its sphere of influence SOI.

Define $(X_c)_{ij} \in R^3$ to be the position of critical point 42 on link i relative to obstacle j as measured on the base frame of the robot system, not shown, where critical point 42 is that point on link i currently at a minimum distance from obstacle j. Here $i=1, 2, \ldots, n$ and there are k obstacles so that $j=1, 2, \ldots, k$. Let $(X_o)_j \in R^3$ and $(r_o)_j$ denote the position of the center and the radius of obstacle j, respectively. Then using $$[d_c(\theta)]_{ij} = ||(X_c)_{ij} - (X_o)_j|| = [((X_c)_{ij} - (X_o)_j)'((X_c)_{ij} - (X_o)_j)]^{\frac{1}{2}} \tag{14}$$

the criterion for obstacle avoidance many be expressed as a set of inequality constraints:

$$[d_c(\theta)]_{ij} - (r_o)_j = g_{ij}(\theta) \geq 0; \tag{15}$$

$$i = 1, 2, \ldots, n, j = 1, 2, \ldots, k$$

For a moving obstacle, $(X_o)_j$ and therefore $g_{ij}$ are functions of time, and hence the inequality constraints of equations (15) must be satisfied for all time t. The constraint ij given in equation (15) is defined to be active if $g_{ij} < 0$, and no more than r constraints are simultaneously active at any time. If the number of active constraints c is less than r, the configuration control scheme automatically uses the $r - c$ additional degrees of redundancy to minimize robot kinetic energy integrated over the entire trajectory.

In the event that more than r constrains are simultaneously active, that is $c > r$, it is appropriate to abort the task, because in general there is no safe trajectory solution to the tracking problem in this case. This does not prevent operation in a workspace containing more than r obstacles, provided that only r are handled at any one time. In view of this approach, the currently active constraints may be stacked into the constraint vector $$g(\theta, t) \geq 0 \quad (16)$$

with $g: R^n \rightarrow R^c$ where $c \leq r$ and the explicit time dependency of g is shown to accommodate moving obstacles. The inequality constraint shown in equation (16) is the same as the constraint shown in equation (11), and therefore this constraint relationship and the desired trajectory for end effector 24 can be tracked simultaneously using the configuration control law provided in equations (9) through (14). In order to implement this scheme, however, an efficient method for locating the active critical points must be developed, and expressions for $E_c$, $\dot{E}_c$, and $J_c$ must be derived as shown below.

In constructing an algorithm to locate active critical points, it is important to note that the locations of the critical points vary during the robot task and must be continuously updated. Thus the algorithm must be computationally efficient. The location of all the critical points, that is, the points on each link closest to each obstacle, must be determined. Then the determination is made if any of these critical points are active, that is, within any obstacle SOIs.

Referring now again to FIG. 2, $X_i \in R^3$ is defined to be the location of joint i relative to a reference, such as the base frame supporting the link, $a_{ij} \in R^+$ to be the distance along link i from joint i to critical point ij, $p_{ij} = (X_o)_j - X_i$, and $e_i = (X_{i+1} - X_i)/l_i$. These definitions may be used to derive the following recursive algorithm for computing the location of all active critical points:

$$a_{ij} = e_i' p_{ij} = \frac{1}{l} [X_{i+1} - X_i]'[(X_o)_j - X_i]$$

if $a_{ij} \leq 0$ then $a_{ij} = 0$ \quad (17)

if $a_{ij} \leq l_i$ then $a_{ij} = l_i$ $$(X_c)_{ij} = X_i + a_{ij} e_i \quad (18)$$

$$(d_c)_{ij} = [((X_c)_{ij} - (X_o)_j)'((X_c)_{ij} - (X_o)_j)]^{\frac{1}{2}} \quad (19)$$

If the inequality $$(d_c)_{ij} < (r_o)_j \quad (20)$$

is true, then $(X_c)_{ij}$ is an active critical point, otherwise it is not active.

Having located the active critical points using the algorithms presented in equations (17) through (20), the constraint vector provided in equation (16) may readily be constructed from the definition provided in equation (15). The fact that all of the constraints included in the constraint vector provided in equation (16) are active makes the calculations of $E_c \in R^c$ and $\dot{E}_c \in R^c$ straightforward, that is, the case $E_{c,i} = 0$ need not be considered.

The expressions for $E_c$, $\dot{E}_c$, and $J_c$ may then be derived as follows:

$$E_c = [E_{c,i}], i = 1, 2, \ldots, c; \quad (21)$$

with $E_{c,i} = (r_o)_i - (d_c)_i$ $\dot{E}_c = [\dot{E}_{c,i}], i = 1, 2, \ldots, c;$ with $$\dot{E}_{c,i} = -\dot{g} = -\left( \frac{\partial g_i}{\partial \theta} \dot{\theta} + \frac{\partial g_i}{\partial t} \right) \quad (22)$$

$$= -\frac{1}{(d_c)_i} [(X_c)_i - (X_o)_i]' \left[ \frac{\partial (X_c)_i}{\partial \theta} \dot{\theta} - (\dot{X}_o)_i \right].$$

where the subscript i refers to element i of g in equation (16); e.g. $(X_c)_i$ and $(X_o)_i$ are the critical point — obstacle pair corresponding to element i of g, and $(d_c)_i$ is the distance between them. Note that $g_i$ is simply the projection of the critical point — obstacle approach velocity $(\dot{X}_c)_i - (\dot{X}_o)_i$ onto the unit vector pointing from $(X_o)_i$ to $(X_c)_i$.

The Jacobian constraint matrix $J_c \in R^{c \times n}$ may be computed row by row through direct differentiation of the elements of g in equation (16):

$$(J_c)_i = \frac{\partial g_i}{\partial \theta} = \frac{1}{(d_c)_i} [(X_c)_i - (X_o)_i]' \left[ \frac{\partial (X_c)_i}{\partial \theta} \right]. \quad (23)$$

The c rows $(J_c)_i$ are then stacked to form $J_c$. The matrix $(J_x)_{ci} = \partial (X_c)_i / \partial \theta \in R^{3 \times n}$ is recognized as the Jacobian of the critical point $(X_c)_i$ in the base frame. The matrix $(J_x)_{ci}$ can be computed very efficiently for any $(X_c)_i$ once the Jacobians of all the robot joints are known. The rows of $J_c$ can therefore be computed efficiently as $$(J_c)_i = \frac{1}{(d_c)_i} [(X_c)_i - (X_o)_i]' (J_x)_{ci} \quad (24)$$

$i = 1, 2, \ldots, c.$

While this invention has been described with reference to its presently preferred embodiment, its scope is not limited thereto. Rather, such scope is only limited insofar as defined by the following set of claims and includes all equivalents thereof.

What is claimed is:

1. A method of controlling a redundant robot, comprising the steps of:
  defining end effector coordinates to position an end effector in a workspace by changing joint angles between links connected to the end effector;
  determining spheres of influence having fixed radii surrounding obstacles at known positions in the workspace;
  defining kinematic tasks for collision avoidance corresponding to additional task motion capability available as a result of the redundancy of the robot, said kinematic tasks including
    (a) continuously determining a first critical point on a link closest to a closest one of said spheres of influence;

(b) defining a first critical distance related to the distance between the first critical point and the obstacle within said closest sphere of influence;

(c) forming inequality constraints in which the first critical distance is greater than the radius of said closest sphere of influence; and combining said end effector coordinates with said kinematic tasks to form task related configuration variables for control of said redundant robot;

dynamically modifying said joint angles while operating the robot system to position the end effector in the work space while maintaining said inequality constraints by stopping motion of the first critical point toward said first obstacle when the first critical distance equals the radius of said closest sphere of influence;

modifying said kinematic tasks to then include (d) continuously determining a second critical point related to a closest point on a link closest to a next closest sphere of influence;

(e) defining a second critical distance related to the distance between the second critical point and a second obstacle, said second obstacle being in said next closest sphere of influence;

(f) forming additional inequality constraints in which the second critical distance is greater than the radius of said next closest sphere of influence; and dynamically modifying said joint angles while operating the robot system to position the end effector in the work space while continuing to stop motion of said first critical point toward said first obstacle and maintaining said additional inequality constraints by stopping motion of the second critical point toward said second obstacle when the second critical distance equals the radius of said next closest sphere of influence.

* * * * *